(12) United States Patent
Deese

(10) Patent No.: US 11,109,572 B2
(45) Date of Patent: Sep. 7, 2021

(54) OBJECT RELEASE ENCLOSURES AND METHODS OF MAKING AND USING THE SAME

(71) Applicant: Kenneth Deese, Newton, GA (US)

(72) Inventor: Kenneth Deese, Newton, GA (US)

(*) Notice: Subject to any disclaimer, the term of this patent is extended or adjusted under 35 U.S.C. 154(b) by 529 days.

(21) Appl. No.: 16/148,281

(22) Filed: Oct. 1, 2018

(65) Prior Publication Data
US 2020/0100472 A1    Apr. 2, 2020

(51) Int. Cl.
*A01K 31/02* (2006.01)
*E05F 3/22* (2006.01)
*A01K 31/07* (2006.01)

(52) U.S. Cl.
CPC .............. *A01K 31/02* (2013.01); *A01K 31/07* (2013.01); *E05F 3/224* (2013.01); *E05F 3/227* (2013.01)

(58) Field of Classification Search
CPC ...... A01K 31/02; A01K 31/07; A01K 31/002; A01K 31/005; A01K 31/06; A01K 31/08; A01K 31/10; A01K 1/0236; A01K 1/0245; A01K 1/031; A01K 1/032; A01K 1/033; A01K 1/034; E05F 3/227; E05F 3/224
See application file for complete search history.

(56) References Cited

U.S. PATENT DOCUMENTS

| | | | |
|---|---|---|---|
| 1,391,489 A | 9/1921 | Wojciech | |
| 3,393,468 A | 7/1968 | Wood | |
| 4,342,172 A | 8/1982 | Guanci | |
| D299,567 S | 1/1989 | Willingham | |
| D300,377 S | 3/1989 | Willingham | |
| 4,829,701 A | 5/1989 | ImBrogno | |
| D410,519 S | 6/1999 | Greenough | |
| 6,588,139 B2 | 7/2003 | Kao | |
| D614,815 S | 4/2010 | Co | |
| D621,102 S | 8/2010 | German | |
| D634,078 S | 3/2011 | Lee | |
| D652,998 S | 1/2012 | Cantwell | |
| D653,405 S | 1/2012 | Cantwell | |
| D653,814 S | 2/2012 | Cantwell | |
| D669,643 S | 10/2012 | Kilroy | |
| D670,448 S | 11/2012 | Cantwell | |
| D672,511 S | 12/2012 | Cantwell | |
| D683,080 S | 5/2013 | Snow | |
| 9,554,553 B2* | 1/2017 | Casto | A01K 1/032 |
| 9,730,437 B2 | 8/2017 | Marks | |
| D825,113 S | 8/2018 | Langenwalter | |
| 10,085,416 B2* | 10/2018 | Link | A01K 1/034 |
| D852,429 S | 6/2019 | Rathman | |
| 10,660,298 B2* | 5/2020 | Cantwell | A01K 1/033 |
| 10,697,213 B2* | 6/2020 | Cantwell | E06B 3/36 |
| 2005/0034679 A1* | 2/2005 | Link | A01K 1/0245 119/474 |
| 2006/0288952 A1* | 12/2006 | Plante | A01K 31/08 119/461 |
| 2010/0275504 A1 | 11/2010 | Hilty | |
| 2010/0313465 A1 | 12/2010 | Haugen | |
| 2012/0186530 A1* | 7/2012 | Cantwell | A01K 1/034 119/474 |
| 2012/0210947 A1* | 8/2012 | DiPaolo | A01K 1/034 119/472 |

(Continued)

*Primary Examiner* — Trinh T Nguyen
(74) *Attorney, Agent, or Firm* — Withers & Keys, LLC

(57) ABSTRACT

Object release enclosures are disclosed. Methods of making and using object release enclosures are also disclosed.

19 Claims, 8 Drawing Sheets

(56) References Cited

U.S. PATENT DOCUMENTS

| | | |
|---|---|---|
| 2013/0047488 A1 | 2/2013 | Hey |
| 2014/0109839 A1* | 4/2014 | Cantwell ................ A01K 1/034 119/481 |
| 2015/0047573 A1 | 2/2015 | Tam |
| 2017/0202204 A1 | 7/2017 | Baxter |
| 2017/0295748 A1* | 10/2017 | He ......................... A01K 1/034 |
| 2018/0020636 A1 | 1/2018 | Weerappuli |

* cited by examiner

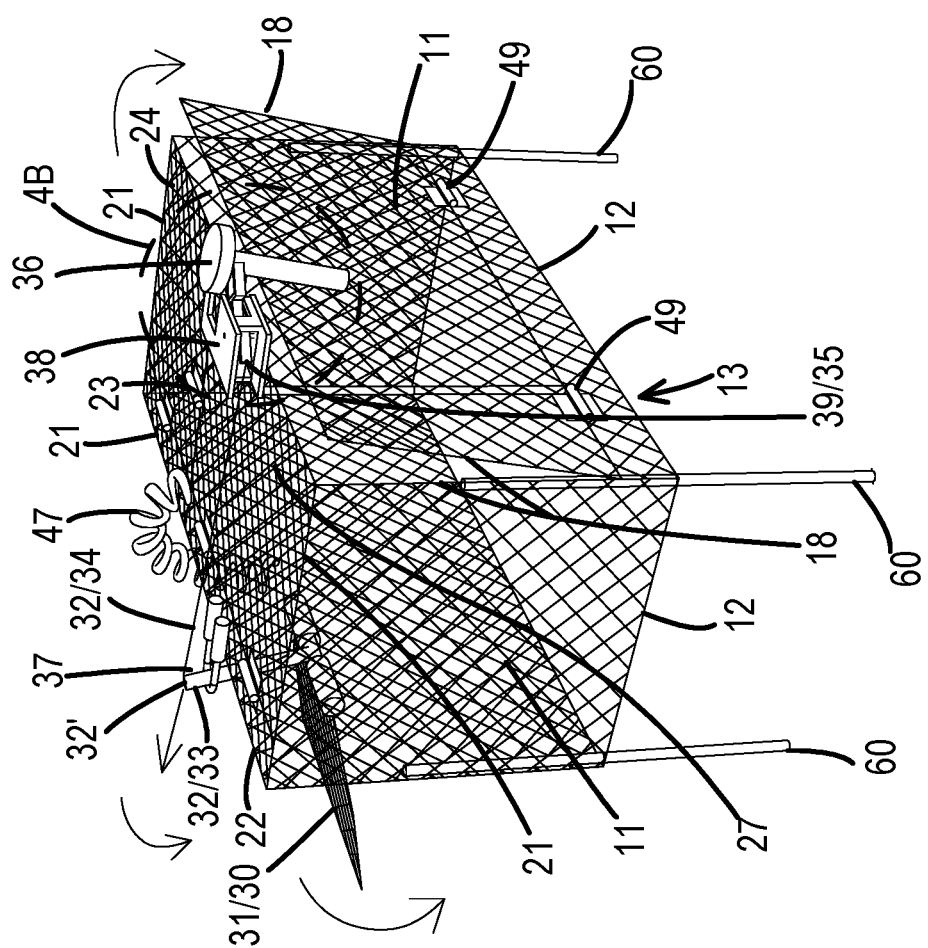

US 11,109,572 B2

OBJECT RELEASE ENCLOSURES AND METHODS OF MAKING AND USING THE SAME

FIELD OF THE INVENTION

The present invention relates generally to object release enclosures, and methods of making and using object release enclosures.

BACKGROUND OF THE INVENTION

There is a need in the art for simple, effective, safe and environmentally-friendly object release enclosures, and methods of making and using object release enclosures.

SUMMARY OF THE INVENTION

The present invention is directed to simple, effective, safe and environmentally-friendly object release enclosures. The disclosed object release enclosures efficiently and safely enable release of one or more objects within the object release enclosures. The disclosed object release enclosures provide cost-effective and convenient object release enclosures.

The present invention is directed to object release enclosures. In some embodiments of the preset invention, the object release enclosure comprises: (a) one or more side walls having (i) a lower side wall edge surrounding a lower side wall opening within the one or more side walls and (ii) an upper side wall edge surrounding an upper side wall opening within the one or more side walls; (b) a top wall extending along the upper side wall edge of the one or more side walls so as to cover the upper side wall opening, the top wall in combination with the one or more side walls surrounding an enclosure volume; and (c) a release mechanism positioned along the top wall or the one or more side walls, the release mechanism providing at least one release opening within (i) the top wall, (ii) the one or more side walls, or (iii) at a junction between the top wall and the upper side wall edge, when the release mechanism is activated.

The present invention is further directed to methods of making the disclosed object release enclosures. In some embodiments of the present invention, the method of making an object release enclosure comprises: (a) attaching the herein described top wall to the herein described one or more side walls; and (b) positioning the herein described release mechanism along the top wall or the one or more side walls.

The present invention is even further directed to methods of using the disclosed object release enclosures. In some embodiments of the preset invention, the method of using an object release enclosure comprises: activating the herein-described release mechanism of the object release enclosure so as to provide at least one release opening within (i) the herein-described top wall, (ii) the herein-described one or more side walls, or (iii) at a junction between the top wall and the upper side wall edge. The method of using an object release enclosure may comprise activating the herein-described release mechanism of the object release enclosure so as to provide at least one release opening within (i) the herein-described top wall, (ii) the herein-described one or more side walls, or (iii) at a junction between the top wall and the upper side wall edge so as to release one or more objects (e.g., one or more birds) from the enclosure volume of the object release enclosure.

These and other features and advantages of the present invention will become apparent after a review of the following detailed description of the disclosed embodiments and the appended claims.

BRIEF DESCRIPTION OF THE FIGURES

The present invention is further described with reference to the appended figures, wherein:

FIG. 4A is another frontal perspective view of the exemplary object release enclosure shown in FIGS. 1 and 3A;

DETAILED DESCRIPTION OF THE INVENTION

The present invention is directed to object release enclosures. The present invention is further directed to methods of making and using object release enclosures.

The present invention will be further described in the following additional embodiments, examples, and claims.

Additional Embodiments

Object Release Enclosures

Figure 1:
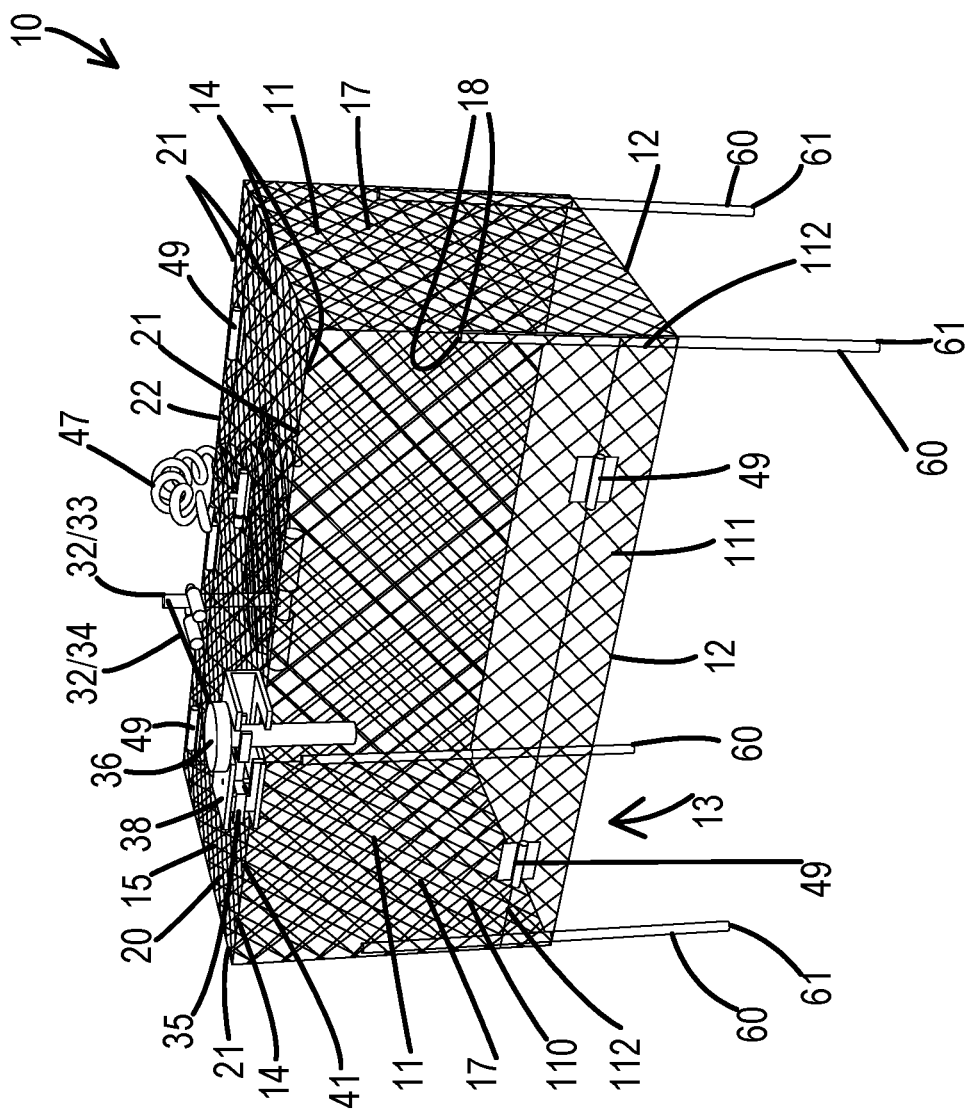
FIG. 1 is a frontal perspective view of an exemplary object release enclosure of the present invention.

1. An object release enclosure 10 comprising: (a) one or more side walls 11 having (i) a lower side wall edge 12 surrounding a lower side wall opening 13 within said one or more side walls 11 and (ii) an upper side wall edge 14 surrounding an upper side wall opening 15 within said one or more side walls 11; (b) a top wall 20 extending along the upper side wall edge 14 of said one or more side walls 11 so as to cover said upper side wall opening 15, said top wall 20 in combination with said one or more side walls 11 surrounding an enclosure volume 16; and (c) a release mechanism 30 positioned along said top wall 20 or said one or more side walls 11, said release mechanism 30 providing at least one release opening 40 within (i) said top wall 20, (ii) said one or more side walls 11, or (iii) at a junction 41 between said top wall 20 and said upper side wall edge 14, when said release mechanism 30 is activated. As shown in FIG. 1, exemplary release mechanism 30 is desirably positioned along said top wall 20 proximate junction 41 between top wall 20 and upper side wall edge 14, but alternative positions include, inner or outer surfaces of said one or more side walls 11.
2. The object release enclosure 10 of embodiment 1, wherein said one or more side walls 11 comprises from 1 to 12 side walls 11.
3. The object release enclosure 10 of embodiment 1 or 2, wherein said one or more side walls 11 comprises from 3 to 6 side walls 11.
4. The object release enclosure 10 of any one of embodiments 1 to 3, wherein said one or more side walls 11 comprises 4 side walls 11.
5. The object release enclosure 10 of any one of embodiments 1 to 4, wherein said one or more side walls 11 have an overall rectangular cross-sectional shape, and a rectangular cross-sectional shape along said upper side wall edge 14 and said lower side wall edge 12.
6. The object release enclosure 10 of any one of embodiments 1 to 5, wherein said top wall 20 has an overall rectangular top wall shape along an outer top wall edge 21 of said top wall 20.
7. The object release enclosure 10 of any one of embodiments 1 to 6, wherein at least two side wall side edges 18 of two adjacent side walls 11 of said one or more side walls 11 are not connected to one another so as to be movable relative to one another.
8. The object release enclosure 10 of any one of embodiments 1 to 7, wherein at least four side wall side edges 18 of three adjacent side walls 11 of said one or more side walls 11 are not connected to one another so as to be movable relative to one another. See, for example, side wall edges 18 in FIG. 5 with release mechanism 30 in an activated state and the release opening 40 at junction 41 between top wall 20 and upper side wall edge 14.
9. The object release enclosure 10 of any one of embodiments 1 to 8, wherein at least a portion 22 of said top wall 20 is attached to said upper side wall side edge 14.
10. The object release enclosure 10 of any one of embodiments 1 to 9, wherein said top wall 20 extends along and is attached to at least one individual side wall upper edge 19 of said one or more side walls 11.
11. The object release enclosure 10 of embodiment 10, wherein said top wall 20 extends along and is attached to at least a portion 19' of each individual side wall upper edge 19 positioned on opposite sides of said at least one individual side wall upper edge 19 of said one or more side walls 11.
12. The object release enclosure 10 of any one of embodiments 1 to 11, wherein said top wall 20 comprises (i) a stationary top wall component 23 that extends along and is attached to said upper side wall edge 14 of said one or more side walls 11 and (ii) a movable top wall component 24 that extends along and is unattached to said upper side wall edge 14 of said one or more side walls 11. See, for example, FIG. 5.
13. The object release enclosure 10 of any one of embodiments 1 to 12, wherein at least one side wall 11 of said one or more side walls 11 comprises a side wall portion 110 that separates and moves relative to a remaining stationary side wall portion 111 of said one or more side walls 11. See, for example, FIG. 5.
14. The object release enclosure 10 of embodiment 13, wherein said at least one side wall 11 extends along and is attached to at least a portion 112 of each individual side wall side edge 18 positioned on opposite sides of said at least one side wall 11.
15. The object release enclosure 10 of any one of embodiments 1 to 14, wherein said at least one side wall 11 comprises (i) a stationary side wall component 111 that extends along said lower side wall edge 12 of said one or more side walls 11 and (ii) a movable side wall component 110 that extends along and is unattached to said side wall edges 18 of said one or more side walls 11.
16. The object release enclosure 10 of any one of embodiments 1 to 15, wherein at least a portion of one wall 11 of (i) said one or more side walls 11 and (ii) said top wall 20 comprises a porous wall.
17. The object release enclosure 10 of any one of embodiments 1 to 16, wherein one or more side walls 11 within said one or more side walls 11 comprise a porous wall.
18. The object release enclosure 10 of any one of embodiments 1 to 17, wherein one or more side walls 11 within said one or more side walls 11 comprise a non-porous wall (not shown).
19. The object release enclosure 10 of any one of embodiments 1 to 17, wherein all side walls 11 within said one or more side walls 11 comprise a porous wall.
20. The object release enclosure 10 of any one of embodiments 1 to 19, wherein at least a portion of said top wall 20 comprises a porous wall.
21. The object release enclosure 10 of any one of embodiments 16 to 20, wherein said porous wall comprises a mesh material.
22. The object release enclosure 10 of any one of embodiments 16 to 21, wherein said porous wall comprises a metal mesh material.
23. The object release enclosure 10 of any one of embodiments 18 to 22, wherein said non-porous wall comprises a wood or metal.
24. The object release enclosure 10 of any one of embodiments 1 to 23, wherein said release mechanism 30, when activated, causes at least one side wall portion 110 within said one or more side walls 11 to separate from a remaining side wall portion 111/11 within said one or more side walls 11 so as to form said at least one release opening 40. See, for example, FIG. 5.
25. The object release enclosure 10 of any one of embodiments 1 to 24, wherein said release mechanism 30, when activated, causes an upper portion 110' of at least one side wall 11 within said one or more side walls 11 to separate from side edges 18 of a remaining stationary side wall portion 111/11 within said one or more side walls 11 so as to form said at least one release opening 40.
26. The object release enclosure 10 of any one of embodiments 1 to 25, wherein said release mechanism 30, when activated, causes at least a portion 24 of said top layer 20 to separate from a remaining top layer portion 23 within said top layer 20 so as to form said at least one release opening 40.
27. The object release enclosure 10 of any one of embodiments 1 to 26, wherein said release mechanism 30, when activated, causes a distal portion 24' of said top layer 20 to move relative to a remaining stationary top wall portion 23 so as to form said at least one release opening 40. See, for example, FIG. 5.
28. The object release enclosure 10 of any one of embodiments 1 to 27, wherein said release mechanism 30, when activated, causes a distal portion 24' of said top layer 20 to separate from and move upward from said upper side wall edge 14. See, FIG. 5.
29. The object release enclosure 10 of any one of embodiments 1 to 28, wherein said release mechanism 30, when activated, causes (i) a distal portion 24' of said top layer 20 to separate from and move upward from said upper side wall edge 14 and (ii) an upper portion 110' of at least one side wall 11 within said one or more side walls 11 to separate from side edges 18 of a remaining stationary side wall portion 111/11 within said one or more side walls 11 so as to form a break within said upper side wall edge 14. See again, FIG. 5. A tensioned spring, such as exemplary spring 47 shown, for example, in FIGS. 1-3A, may be used to force distal portion 24' of top layer 20 so as to separate from and move upward from upper side wall edge 14.

30. The object release enclosure 10 of any one of embodiments 1 to 29, wherein said release mechanism 30 is a foot-activated release mechanism 30, said foot-activated release mechanism 30 being activated by pushing downward on a foot pedal 31 of said release mechanism 30.

Figure 4B:
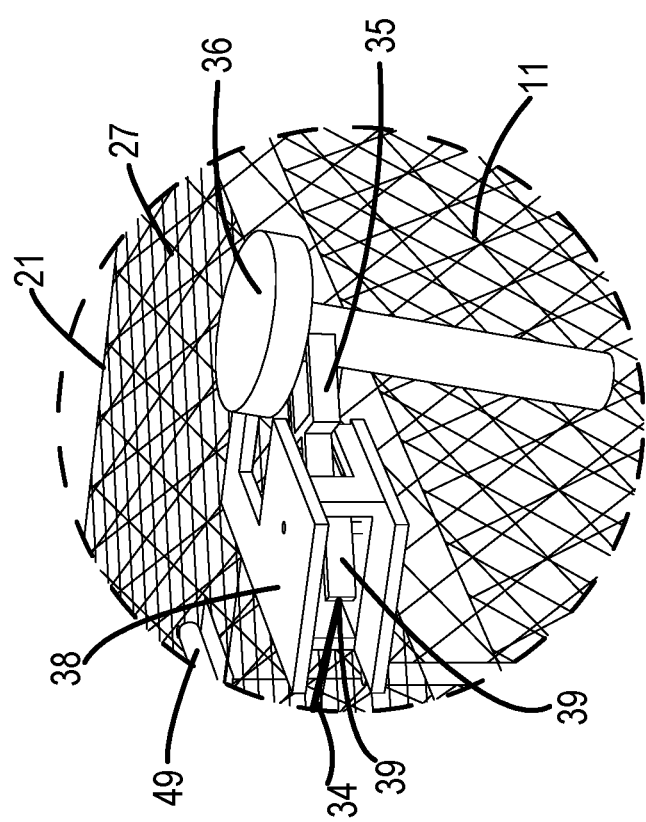
FIG. 4B is a close-up view of the exemplary locking mechanism, shown in an unlocked position, which is suitable for use in the exemplary object release enclosure shown in FIGS. 1 and 3A.
Figure 5:
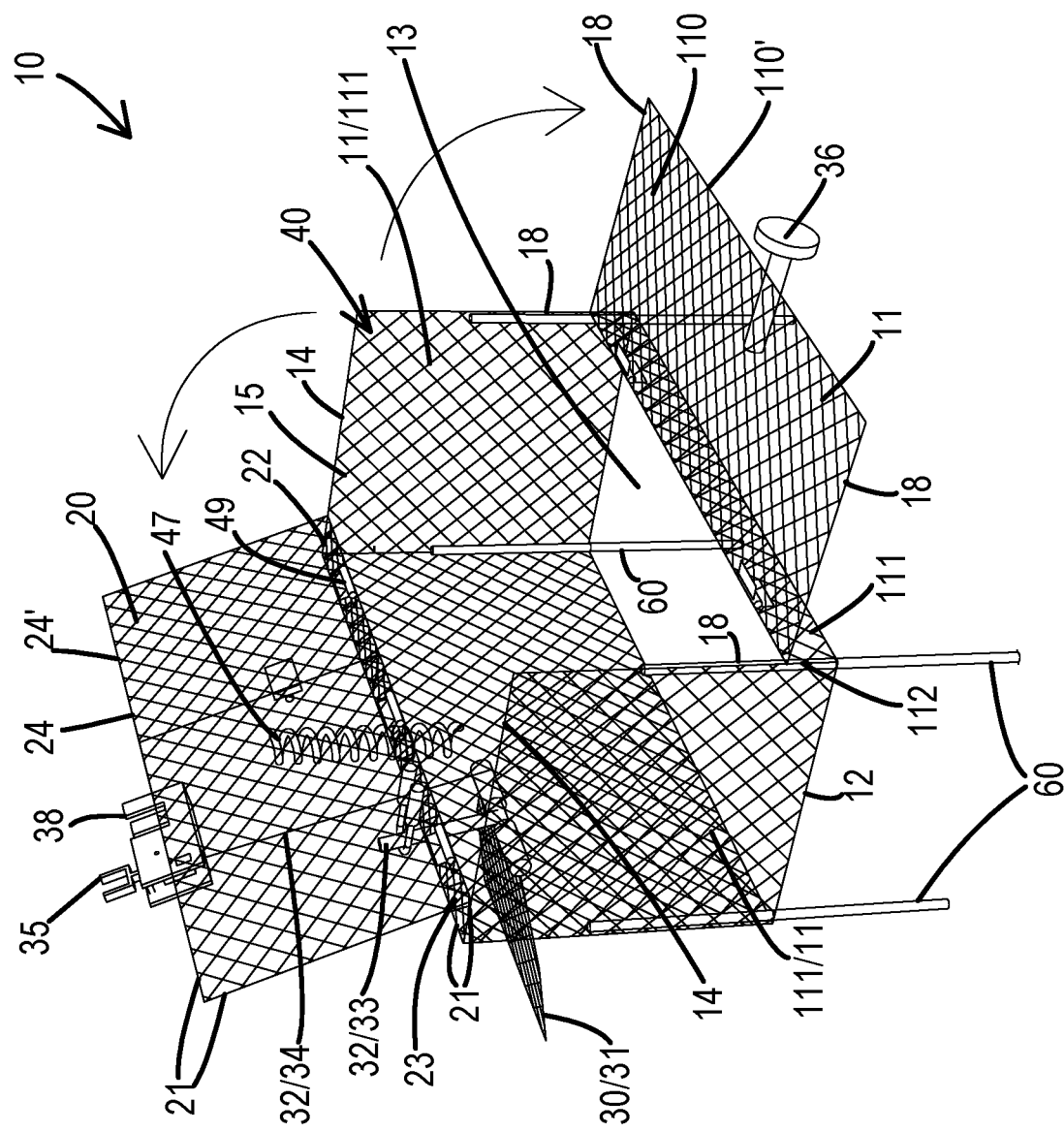
FIG. 5 is another frontal perspective view of the exemplary object release enclosure shown in FIG. 1 with a release mechanism activated so that the exemplary object release enclosure is in an object (e.g., a bird or drone) release position (i.e., open)

31. The object release enclosure 10 of any one of embodiments 1 to 30, wherein said release mechanism 30 comprises a foot pedal 31, and one or more connecting members 32 that connect said foot pedal 31 to one or more locking mechanisms 38 along (i) said top wall 20, (ii) said one or more side walls 11, or (iii) both of (i) said top wall 20 and (ii) said one or more side walls 11. As shown in FIG. 1, exemplary locking mechanism 38 is positioned along top wall 20, and is connected to exemplary foot pedal 31 via exemplary moving member 33, which is attached to exemplary wire 34, which is attached to exemplary latch (or lever arm) 35 of exemplary locking mechanism 38. As exemplary foot pedal 31 moves downward, exemplary moving member 33 moves away from upper edge 14, which moves exemplary wire 34 towards a rearward direction (i.e., towards exemplary foot pedal 31), which causes exemplary latch (or lever arm) 35 within exemplary locking mechanism 38 to move from a locked position (as shown in FIGS. 1-3B) into an unlocked position (as shown in FIGS. 4A-5). As exemplary latch (or lever arm) 35 within exemplary locking mechanism 38 moves from a locked position (as shown in FIGS. 1-3B) into an unlocked position (as shown in FIGS. 4A-5), exemplary latch (or lever arm) 35 releases one or more connector components 36 (discussed below) from exemplary locking mechanism 38 and moves the one or more connector components 36 outward away from upper side wall edge 14. Momentum of the one or more connector components 36 causes a portion 110" of one of the one or more side walls 11 to move forward, away from upper side wall edge 14. See, for example, FIG. 5.

32. The object release enclosure 10 of any one of embodiments 1 to 31, wherein said release mechanism 30 comprises a foot pedal 31, and one or more connecting members 32 that connect said foot pedal 31 to said one or more exemplary locking mechanisms 38 along said top wall 20.

33. The object release enclosure 10 of any one of embodiments 1 to 32, wherein said release mechanism 30 comprises a foot pedal 31, and one or more connecting members 32 that connect said foot pedal 31 to said one or more exemplary locking mechanisms 38 along said one or more side walls 11.

34. The object release enclosure 10 of any one of embodiments 1 to 33, wherein said release mechanism 30 comprises a foot pedal 31, and one or more connecting members 32 that connect said foot pedal 31 to said one or more exemplary locking mechanisms 38 along both of (i) said top wall 20 and (ii) said one or more side walls 11.

35. The object release enclosure 10 of any one of embodiments 31 to 34, wherein said one or more connecting members 32 comprises (i) one or more moving members 33 attached to said foot pedal 31 (i.e., directly or indirectly attached to said foot pedal 31) so as to move when said foot pedal 31 moves, (ii) one or more wire components 34 attached to said foot pedal 31 (i.e., directly or indirectly attached to said foot pedal 31) so as to move when said foot pedal 31 moves, (iii) one or more first latches 35 that move from a secure/locked position (FIGS. 1-3A) to an unsecure/unlocked position (FIGS. 4A-5) when said foot pedal 31 moves, (iv) one or more connector components 36 (I) attached to (a) said top wall 20, (b) said one or more side walls 11, or (c) both (a), and (II) that are disconnected from said one or more first latches 35 when said foot pedal 31 moves, or (v) any combination of or all of (i) to (iv). See, for example, exemplary connector component 36 that is attached to an inner or outer surface of side wall portion 110 shown in FIG. 5.

36. The object release enclosure 10 of embodiment 35, wherein said one or more moving members 32 is present and is attached to said foot pedal 31, said one or more moving members 32 comprises at least one rod member 32' extending upward from said foot pedal 31.

37. The object release enclosure 10 of embodiment 36, wherein said one or more wire components 34 is present, and a first wire component end 37 of said one or more wire components 34 is attached to a rod member end 38 of said at least one rod member 32' opposite said foot pedal 31.

38. The object release enclosure 10 of embodiment 37, wherein said one or more first latches 35 is present, and a second wire component end 39, opposite said first wire component end 37, of said one or more wire components 34 is attached to at least one first latch 35 of said one or more first latches 35. See, for example, FIG. 4A.

39. The object release enclosure 10 of any one of embodiments 35 to 38, wherein said one or more first latches 35 is positioned on an upper surface 27 of said top wall 20 proximate said upper side wall edge 14.

40. The object release enclosure 10 of any one of embodiments 35 to 39, wherein said one or more connector components 36 is present and attached to said one or more side walls 11. As discussed above, one or more exemplary connector components 36 may be independently attached to an inner and/or outer surface of one or more side wall portions 110.

41. The object release enclosure 10 of any one of embodiments 35 to 40, wherein said one or more connecting members 32 comprises each of: (i) one or more moving members 33 attached to said foot pedal 31 (i.e., directly or indirectly attached to said foot pedal 31) so as to move when said foot pedal 31 moves, (ii) one or more wire components 34 attached to said foot pedal 31 (i.e., directly or indirectly attached to said foot pedal 31 such as thru one or more moving members 33 attached to foot pedal 31) so as to move when said foot pedal 31 moves, (iii) one or more first latches 35 that move from a secure/locked position to an unsecure/unlocked position when said foot pedal 31 moves, (iv) one or more connector components 36 (I) attached to (a) said top wall, (b) said one or more side walls, or (c) both (a) and (b) and (II) that disconnect from said one or more first latches 35 when said foot pedal 31 moves (e.g., moves downward as shown in FIGS. 4A-5).

Figure 2:
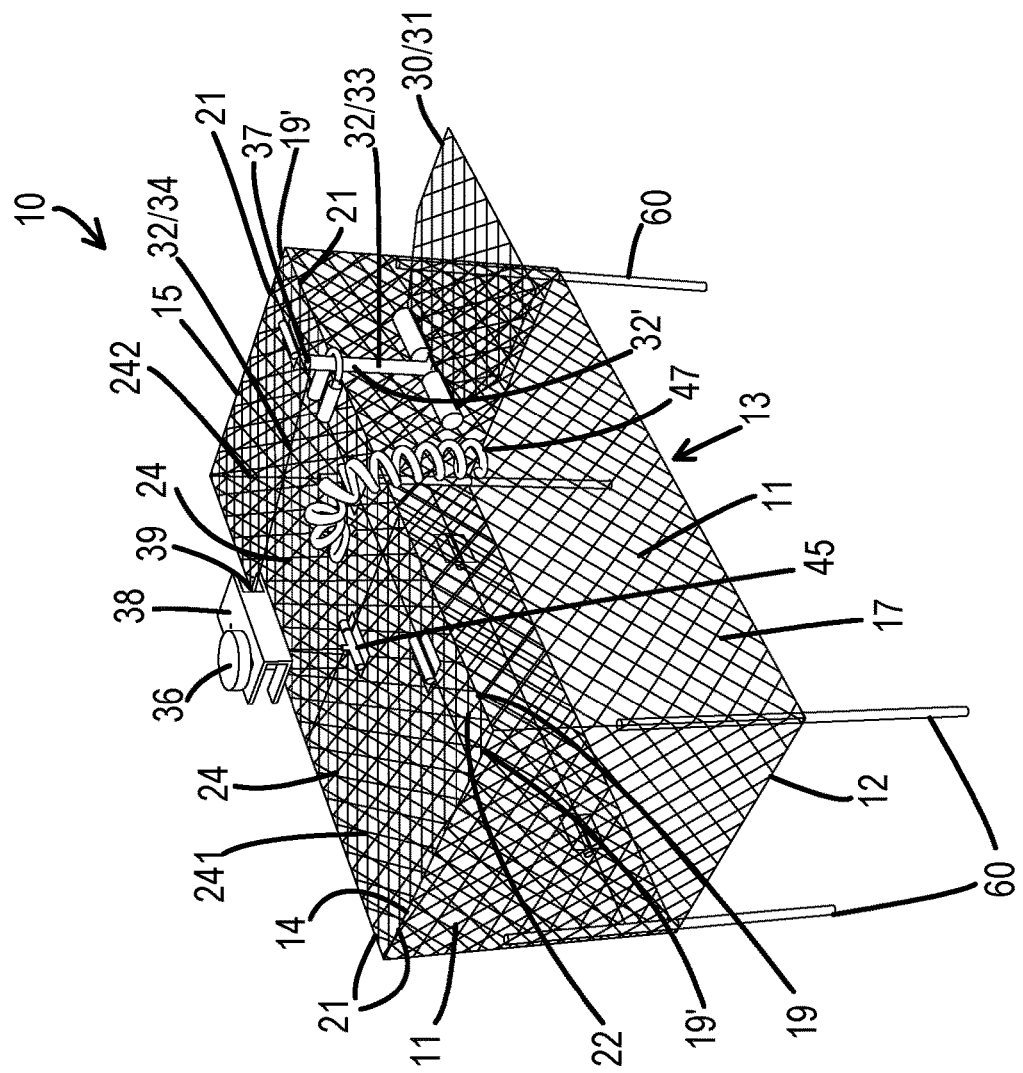
FIG. 2 is a rear perspective view of the exemplary object release enclosure shown in FIG. 1.
Figure 3A:
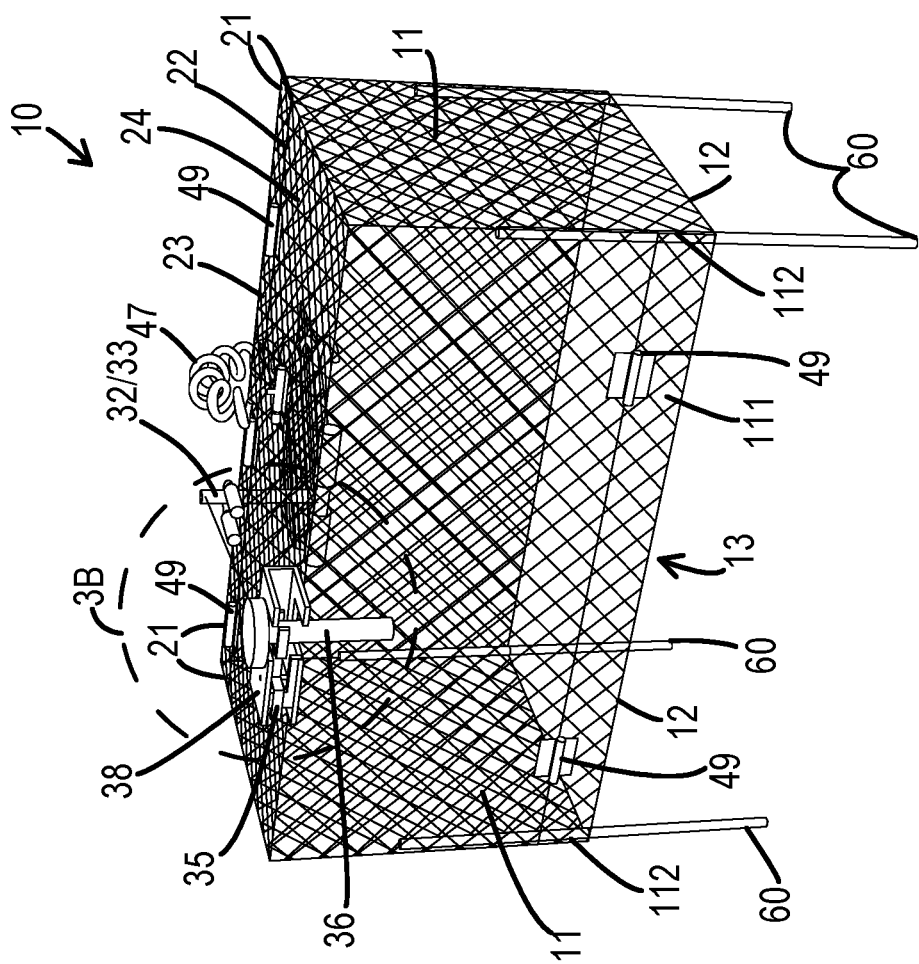
FIG. 3A is another frontal perspective view of the exemplary object release enclosure shown in FIG. 1.
Figure 3B:
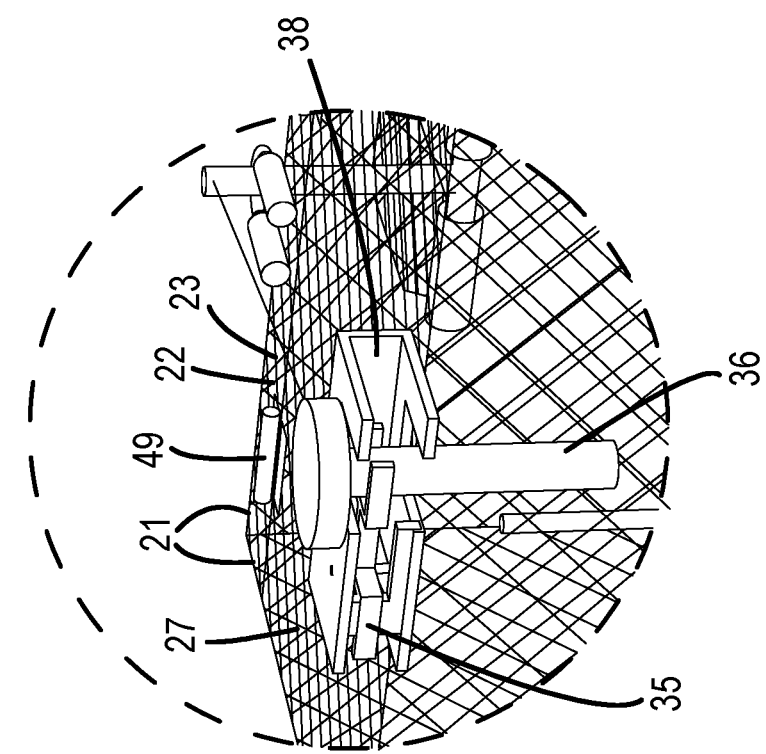
FIG. 3B is a close-up view of an exemplary locking mechanism, shown in a locked position, which is suitable for use in the exemplary object release enclosure shown in FIGS. 1 and 3A.

42. The object release enclosure 10 of any one of embodiments 1 to 41, wherein said object release enclosure 10 further comprises one or more spring members 47 extending between (a) portions of said top wall 20, (b) portions of said one or more side walls 11, (c) said top wall 20 and said one or more side walls 11, (d) said release mechanism 30 and (i) a portion of said top wall 20, (ii) a portion of said one or more side walls 11, or (iii) both (i) and (ii), or (e) any combination of or all of (a) to (d). As shown in FIG. 2, exemplary spring member 47 is attached to a portion of top wall 20 and a portion of rear side wall 11.

Figure 6:
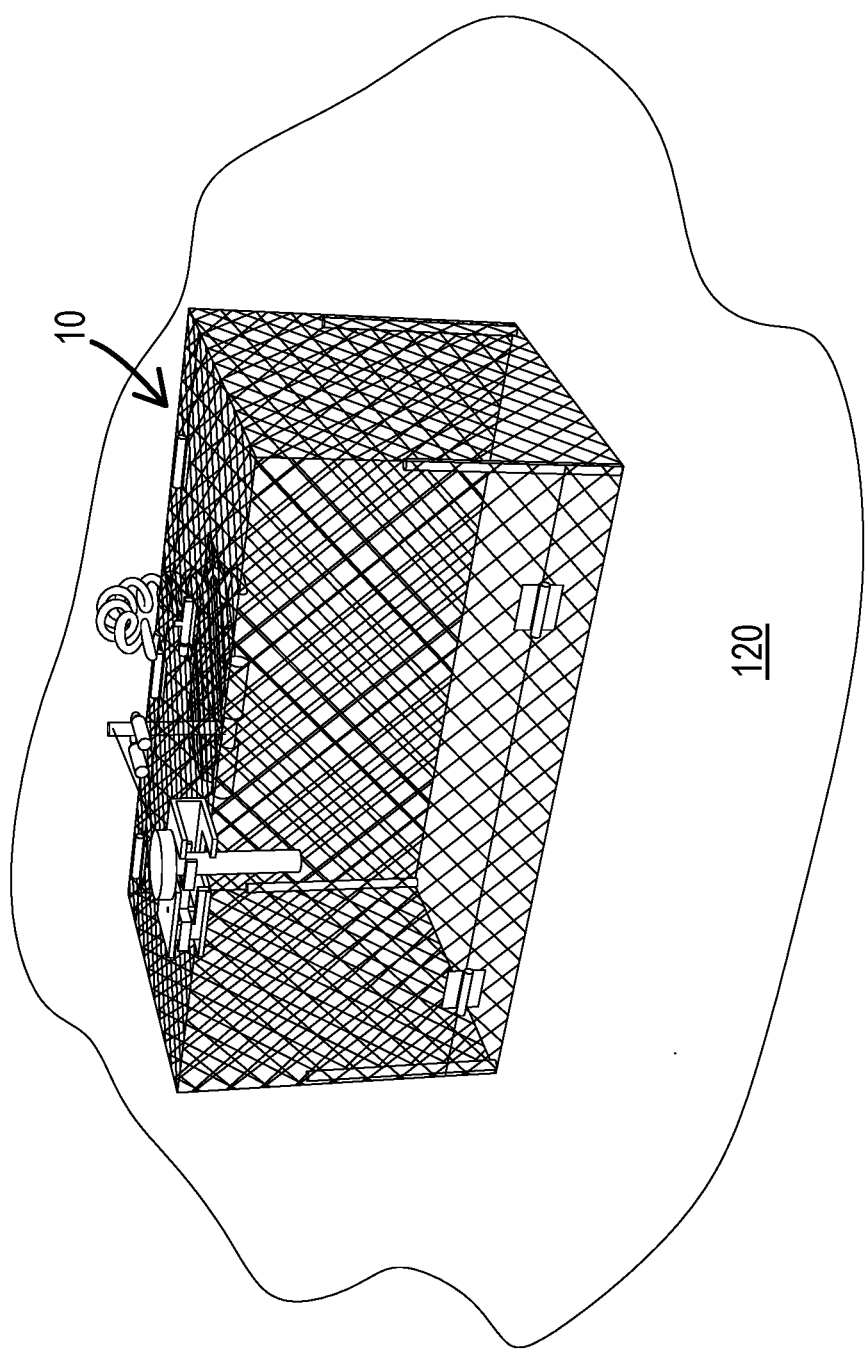
FIG. 6 depict the exemplary object release enclosure shown in FIG. 1 in a "use" position with the legs of the exemplary object release enclosure embedded (i.e., buried) in the ground.

43. The object release enclosure 10 of any one of embodiments 1 to 42, wherein said object release enclosure 10 further comprises one or more second latches 45 extending between (a) portions of said top wall 20, (b) portions of said one or more side walls 11, (c) said top wall 20 and said one or more side walls 11, or (d) any combination of or all of (a) to (c). See, for example, exemplary second latch 45 positioned along upper surface 27 of top wall 20 separating two portions 241/242 of top wall 20 in FIG. 2. In some embodiments, portion 241 of top wall 20 may be opened (i.e., moved upward from along upper edge 14) while portion 242 of top wall 20 remains closed (i.e., in the position shown in FIG. 2) when second latch 45 is unlocked. The opening formed when portion 241 of top wall 20 is opened may be used to input objects (e.g., birds) into object release enclosure 10 when object release enclosure 10 is positioned along the ground 120 (i.e., in a use configuration with legs 60 buried in the ground 120 as shown in FIG. 6 such that the ground 120 forms the last "wall" of the object release enclosure 10, blocking lower side wall opening 13). When second latch 45 is locked, portions 241/242 of top wall 20 move together. When second latch 45 is unlocked, portions 241/242 of top wall 20 move separately from one another.

44. The object release enclosure 10 of any one of embodiments 1 to 43, wherein said object release enclosure 10 further comprises one or more hinges 49 extending between (a) portions of said top wall 20, (b) portions of said one or more side walls 11, (c) said top wall 20 and said one or more side walls 11, or (d) any combination of or all of (a) to (c). See, for example, exemplary hinges 49 (i) positioned between portions of top wall 20 (e.g., between movable top wall portion 24 and stationary top wall portion 23 shown in FIG. 3A-5) and (ii) positioned between portions of side wall 11 (e.g., between movable side wall portion 110 and stationary side wall portion 111 shown in FIG. 3A-5).

45. The object release enclosure 10 of any one of embodiments 1 to 44, wherein said object release enclosure 10 further comprises one or more legs 60 extending downward below said lower side wall edge 12.

46. The object release enclosure 10 of any one of embodiments 1 to 45, wherein said object release enclosure 10 further comprises from 1 to 12 legs 60 extending downward below said lower side wall edge 12.

47. The object release enclosure 10 of any one of embodiments 1 to 46, wherein said object release enclosure 10 further comprises from 2 to 4 legs 60 extending downward below said lower side wall edge 12.

48. The object release enclosure 10 of any one of embodiments 1 to 47, wherein said object release enclosure 10 further comprises 4 legs 60 extending downward below said lower side wall edge 12.

49. The object release enclosure 10 of any one of embodiments 45 to 48, wherein each leg 60 within said one or more legs 60 extends from about 2.0 inches (in) to about 12.0 in below said lower side wall edge 12.

50. The object release enclosure 10 of any one of embodiments 45 to 49, wherein each leg 60 within said one or more legs 60 extends from about 3.0 in to about 6.0 in below said lower side wall edge 12.

51. The object release enclosure 10 of any one of embodiments 45 to 50, wherein each leg 60 within said one or more legs 60 extends about 4.0 in below said lower side wall edge 12.

52. The object release enclosure 10 of any one of embodiments 1 to 51, wherein said lower side wall opening 13 is uncovered. In other words, when object release enclosure 10 is positioned along the ground 120 with one or more legs 60 buried in the ground 120, lower side wall opening 13 is open to the ground 120, and the ground 120 forms a natural lower wall for object release enclosure 10 (i.e., covers lower side wall opening 13).

53. The object release enclosure 10 of any one of embodiments 1 to 52, wherein each component 11/20/30 etc. of said object release enclosure 10 independently comprises a metal, a polymer, a cellulosic material (e.g., wood), or any combination thereof.

54. The object release enclosure 10 of any one of embodiments 1 to 53, wherein each component of said object release enclosure 10 independently comprises a metal.

55. The object release enclosure 10 of any one of embodiments 1 to 54, wherein said object release enclosure 10 is positioned on a ground surface 120 so that the ground surface 120 extends along said lower side wall opening 13.

56. The object release enclosure 10 of any one of embodiments 1 to 55, wherein said enclosure volume 16 comprises one or more birds (not shown) therein. As discussed herein, other than birds, one or more other objects (not shown) may be positioned within the enclosure volume 16 of the object release enclosure 10, the one or more objects comprising one or more drones, one or more animals (e.g., mammals, reptiles, insects, etc.), or any combination thereof.

57. The object release enclosure 10 of any one of embodiments 1 to 56, wherein said enclosure volume 16 is from about 0.5 cubic feet ($ft^3$) to about 24.0 $ft^3$.

Methods of Making Object Release Enclosures

58. A method of making the object release enclosure 10 of any one of embodiments 1 to 57, said method comprising: attaching the top wall 20 to the one or more side walls 11; and positioning the release mechanism 30 along the top wall 20 or the one or more side walls 11.

59. The method of embodiment 58, wherein said attaching step comprises a welding step, a mechanical step (e.g., using wire, screw, bolts, or any combination thereof to attach the top wall 20 to the one or more side walls 11), an adhesion step (e.g., using an adhesive to attach the top wall 20 to the one or more side walls 11), or any combination thereof.

60. The method of embodiment 58 or 59, wherein said method comprises one or more steps selected from: cutting the one or more side walls 11 from a sheet of mesh material (not shown); cutting the top wall 20 from a sheet of mesh material (not shown); attaching one or more legs 60 to the one or more side walls 11 and/or the top wall 20 so that a lower end 61 of each leg 60 extends below the lower side wall edge 12 of the object release enclosure 10; attaching one or more locking mechanisms 38 and/or one or more first latches 35 to the one or more side walls 11 and/or the top wall 20, the one or more first latches 35 being movable from a secure/locked position to an unsecure/unlocked position when the release mechanism 30 is activated; attaching one or more second latches 45 to the one or more side walls 11 and/or the top wall 20, the one or more second latches 45 extending between (a) portions of the top wall 20, (b) portions of the one or more side walls 11, (c) the top wall 20 and the one or more side walls 11, or (d) any combination of or all of (a) to (c); attaching one or more hinges 49 to the one or more side walls 11 and/or the top wall 20, the one or more hinges 49 extending between (a) portions of the top wall 20, (b) portions of the one or more side walls 11, (c) the top wall 20 and the one or more side walls 11, or (d) any combination of or all of (a) to (c); attaching one or more connecting members 32 of the release mechanism 30 to the object release enclosure 10, the one or more connecting members 32 comprising (i) one or more moving members 33 attached to a foot pedal 31 (i.e., directly or indirectly attached to the foot pedal 31 as discussed above) so as to move when the foot pedal 31 moves, (ii) one or more wire components 34 attached to the foot pedal 31 (i.e., directly or indirectly attached to said foot pedal 31 as discussed above) so as to move when the foot pedal 31 moves, (iii) one or more first latches 35 that move from a secure position to an unsecure position when the foot pedal 31 moves, (iv) one or more connector components 36 (I) attached to (a) the top wall 20, (b) the one or more side walls 11, or (c) both (a) and (b) and (II) are disconnected from the one or more first latches 35 when the foot pedal 31 moves, or (v) any combination of or all of (i) to (iv); attaching one or more spring members 47 to the object release enclosure 10, the one or spring members 47 extending between (a) portions of the top wall 20, (b) portions of the one or more side walls 11, (c) the top wall 20 and the one or more side walls 11, (d) the release mechanism 30 and (i) a portion of the top wall 20, (ii) a portion of the one or more side walls 11, or (iii) both (i) and (ii), or (e) any combination of or all of (a) to (d); and any combination of the above-recited steps.

Methods of Using Object Release Enclosures

61. A method of using the object release enclosure 10 of any one of embodiments 1 to 57, said method comprising: activating the release mechanism 30 of the object release enclosure 10 so as to provide at least one release opening 40 within (i) the top wall 20, (ii) the one or more side walls 11, or (iii) at a junction 41 between the top wall 20 and the upper side wall edge 14.
62. The method of embodiment 61, wherein said activating step comprises pushing down on a foot pedal 31 of the release mechanism 30.
63. The method of embodiment 61 or 62, wherein said activating step provides at least one release opening 40 at a junction 41 between the top wall 20 and the upper side wall edge 14.
64. The method of any one of embodiments 61 to 63, further comprising resetting the release mechanism 30 by closing the at least one release opening 40, if open, and repositioning one or more components 31/35/36 of the release mechanism 30 to a non-activated position.
65. The method of any one of embodiments 61 to 64, further comprising positioning the object release enclosure 10 along a ground surface 120 so that the lower side wall edge 12 is along the ground surface 120.
66. The method of any one of embodiments 61 to 65, further comprising pushing one or more legs 60 of the object release enclosure 10 into a ground surface 120 so that the lower side wall edge 12 is along the ground surface 120.
67. The method of any one of embodiments 61 to 66, further comprising inputting one or more objects (not shown) within the enclosure volume 16 of the object release enclosure 10.
68. The method of any one of embodiments 61 to 67, further comprising inputting one or more objects (not shown) within the enclosure volume 16 of the object release enclosure 10, the one or more objects comprising one or more birds, one or more drones, one or more animals (e.g., mammals, reptiles, insects, etc.), or any combination thereof.
69. The method of any one of embodiments 61 to 68, further comprising inputting one or more objects (not shown) within the enclosure volume 16 of the object release enclosure 10, the one or more objects comprising one or more birds.

Methods of Making and Using Object Release Enclosures

70. The method of any one of embodiments 58 to 69, wherein each component 11/20/30 etc. of the object release enclosure 10 independently comprises a metal, a polymer, a cellulosic material (e.g., wood), or any combination thereof.
71. The method of any one of embodiments 58 to 70, wherein each component 11/20/30 etc. of the object release enclosure 10 independently comprises a metal.
72. The method of any one of embodiments 58 to 71, wherein the enclosure volume 16 is from about 0.5 cubic feet ($ft^3$) to about 24.0 $ft^3$.

The present invention is further illustrated by the following examples, which are not to be construed in any way as imposing limitations upon the scope thereof. On the contrary, it is to be clearly understood that resort may be had to various other embodiments, modifications, and equivalents thereof which, after reading the description herein, may suggest themselves to those skilled in the art without departing from the spirit of the present invention and/or the scope of the appended claims.

Example 1

Preparation of Object Release Enclosures

Exemplary object release enclosures 10 as shown in FIGS. 1-5 were prepared. The exemplary object release enclosures 10 were positioned next to and/or within a ground surface 120 as shown in FIG. 6 and used to release objects, such as birds, during a bird hunt.

In addition, it should be understood that although the above-described object release enclosures and methods are described as "comprising" one or more components or steps, the above-described object release enclosures and methods may "comprise," "consists of," or "consist essentially of" the above-described components or steps of the object release enclosures and methods. Consequently, where the present invention, or a portion thereof, has been described with an open-ended term such as "comprising," it should be readily understood that (unless otherwise stated) the description of the present invention, or the portion thereof, should also be interpreted to describe the present invention, or a portion thereof, using the terms "consisting essentially of" or "consisting of" or variations thereof as discussed below.

As used herein, the terms "comprises," "comprising," "includes," "including," "has," "having," "contains", "containing," "characterized by" or any other variation thereof, are intended to encompass a non-exclusive inclusion, subject to any limitation explicitly indicated otherwise, of the recited components. For example, an object release enclosure and/or method that "comprises" a list of elements (e.g., components or steps) is not necessarily limited to only those elements (or components or steps), but may include other elements (or components or steps) not expressly listed or inherent to the object release enclosure and/or method.

As used herein, the transitional phrases "consists of" and "consisting of" exclude any element, step, or component not specified. For example, "consists of" or "consisting of" used in a claim would limit the claim to the components, materials or steps specifically recited in the claim except for impurities ordinarily associated therewith (i.e., impurities within a given component). When the phrase "consists of" or "consisting of" appears in a clause of the body of a claim, rather than immediately following the preamble, the phrase "consists of" or "consisting of" limits only the elements (or components or steps) set forth in that clause; other elements (or components) are not excluded from the claim as a whole.

As used herein, the transitional phrases "consists essentially of" and "consisting essentially of" are used to define an object release enclosure and and/or a method that includes materials, steps, features, components, or elements, in addition to those literally disclosed, provided that these additional materials, steps, features, components, or elements do not materially affect the basic and novel characteristic(s) of the claimed invention. The term "consisting essentially of" occupies a middle ground between "comprising" and "consisting of".

Further, it should be understood that the herein-described object release enclosures and/or methods may comprise, consist essentially of, or consist of any of the herein-described components and features, as shown in the figures with or without any feature(s) not shown in the figures. In other words, in some embodiments, the object release enclosures of the present invention do not have any additional features other than those shown in the figures, and such additional features, not shown in the figures, are specifically excluded from the object release enclosures. In other embodiments, the object release enclosures of the present invention do have one or more additional features that are not shown in the figures.

The present invention is described above and further illustrated below by way of claims, which are not to be construed in any way as imposing limitations upon the scope of the invention. On the contrary, it is to be clearly understood that resort may be had to various other embodiments, modifications, and equivalents thereof which, after reading the description herein, may suggest themselves to those skilled in the art without departing from the spirit of the present invention and/or the scope of the appended claims.

What is claimed is:

1. An object release enclosure comprising:
   one or more side walls having (i) a lower side wall edge surrounding a lower side wall opening within said one or more side walls and (ii) an upper side wall edge surrounding an upper side wall opening within said one or more side walls;
   a top wall extending along the upper side wall edge of said one or more side walls so as to cover said upper side wall opening, said top wall in combination with said one or more side walls surrounding an enclosure volume;
   a release mechanism positioned along said top wall or said one or more side walls, said release mechanism providing at least one release opening within (i) said top wall, (ii) said one or more side walls, or (iii) at a junction between said top wall and said upper side wall edge, when said release mechanism is activated; and wherein said release mechanism comprises a foot pedal, and one or more connecting members that connect said foot pedal to (i) said top wall, (ii) said one or more side walls, or (iii) both of (i) said top wall and (ii) said one or more side walls; wherein said one or more connecting members comprising (i) one or more moving members attached to said foot pedal so as to move when said foot pedal moves, (ii) one or more wire components attached to said foot pedal so as to move when said foot pedal moves, (iii) one or more first latches that move from a secure position to an unsecure position when said foot pedal moves, (iv) one or more connector components attached to (a) said top wall, (b) said one or more side walls, or (c) both (a) and (b) that are disconnected from said one or more first latches when said foot pedal moves, or (v) any combination of or all of (i) to (iv).

2. The object release enclosure of claim 1, wherein said one or more side walls (i) comprises 4 side walls, (ii) has an overall rectangular cross-sectional shape, and (iii) has a rectangular cross-sectional shape along said upper side wall edge and said lower side wall edge.

3. The object release enclosure of claim 1, wherein at least four side wall side edges of three adjacent side walls of said one or more side walls are not connected to one another so as to be movable relative to one another.

4. The object release enclosure of claim 1, wherein said top wall extends along and is attached to at least one individual side wall upper edge of said one or more side walls.

5. The object release enclosure of claim 1, wherein (a) said top wall comprises (i) a stationary top wall component that extends along and is attached to said upper side wall edge of said one or more side walls and (ii) a movable top wall component that extends along and is unattached to said upper side wall edge of said one or more side walls, and (b) at least one side wall of said one or more side walls comprises a side wall portion that separates and moves relative to a remaining stationary side wall portion of said one or more side walls.

6. The object release enclosure of claim 1, wherein said release mechanism, when activated, causes an upper portion of at least one side wall within said one or more side walls to separate from side edges of a remaining stationary side wall portion within said one or more side walls so as to form said at least one release opening.

7. The object release enclosure of claim 6, wherein said release mechanism, when activated, causes at least a portion of said top layer to separate from a remaining top layer portion within said top layer so as to form said at least one release opening.

8. The object release enclosure of claim 1, wherein said release mechanism is a foot-activated release mechanism, said foot-activated release mechanism being activated by pushing downward on a foot pedal of said release mechanism.

9. The object release enclosure of claim 1, wherein said one or more connecting members comprises each of: (i) one or more moving members attached to said foot pedal so as to move when said foot pedal moves, (ii) one or more wire components attached to said foot pedal so as to move when said foot pedal moves, (iii) one or more first latches that move from a secure position to an unsecure position when said foot pedal moves, (iv) one or more connector components attached to (a) said top wall, (b) said one or more side walls, or (c) both (a) and (b) that are disconnected from said one or more first latches when said foot pedal moves.

10. The object release enclosure of claim 1, wherein said object release enclosure further comprises one or more second latches extending between (a) portions of said top wall, (b) portions of said one or more side walls, (c) said top wall and said one or more side walls, or (d) any combination of or all of (a) to (c).

11. The object release enclosure of claim 1, wherein said object release enclosure further comprises one or more hinges extending between (a) portions of said top wall, (b) portions of said one or more side walls, (c) said top wall and said one or more side walls, or (d) any combination of or all of (a) to (c).

12. The object release enclosure of claim 1, wherein said object release enclosure further comprises 4 legs extending downward below said lower side wall edge.

13. The object release enclosure of claim 1, wherein said lower side wall opening is uncovered.

14. The object release enclosure of claim 1, wherein said enclosure volume comprises one or more birds therein.

15. The object release enclosure of claim 1, wherein said enclosure volume is from about 0.5 cubic feet ($ft^3$) to about 24.0 $ft^3$.

16. A method of using the object release enclosure of claim 1, said method comprising:
   activating the release mechanism of the object release enclosure so as to provide at least one release opening within (i) the top wall, (ii) the one or more side walls, or (iii) at a junction between the top wall and the upper side wall edge.

17. The method of claim 16, wherein said activating step comprises pushing down on a foot pedal of the release mechanism so as to release one or more birds from the enclosure volume.

18. An object release enclosure comprising:
   one or more side walls having (i) a lower side wall edge surrounding a lower side wall opening within said one or more side walls and (ii) an upper side wall edge surrounding an upper side wall opening within said one or more side walls;
   a top wall extending along the upper side wall edge of said one or more side walls so as to cover said upper side wall opening, said top wall in combination with said one or more side walls surrounding an enclosure volume, said enclosure volume being from about 0.5 cubic feet ($ft^3$) to about 24.0 $ft^3$; and
   a release mechanism positioned along said top wall or one of said one or more side walls, said release mechanism providing at least one release opening within (i) said top wall, (ii) one or more of said one or more side walls, or (iii) at a junction between said top wall and said upper side wall edge, when said release mechanism is activated, said release mechanism comprising:
   a foot pedal,
   one or more first latches that move from a secure position to an unsecure position when said foot pedal moves, and
   one or more connecting members that connect said foot pedal to said one or more first latches, and
   wherein as said one or more first latches move from the secure position to the unsecure position, said one or more first latches (i) release one or more connector components and (ii) move the one or more connector components outward away from said upper side wall edge so as to provide the at least one release opening.

19. An object release enclosure comprising:
   four side walls having (i) a lower side wall edge surrounding a lower side wall opening within said four side walls and (ii) an upper side wall edge surrounding an upper side wall opening within said four side walls;
   a top wall extending along the upper side wall edge of said four side walls so as to cover said upper side wall opening, said top wall in combination with said four side walls surrounding an enclosure volume, said enclosure volume being from about 0.5 cubic feet ($ft^3$) to about 24.0 $ft^3$; and
   a release mechanism positioned along said top wall or one of said four side walls, said release mechanism providing at least one release opening within (i) said top wall, (ii) one or more of said four side walls, or (iii) at a junction between said top wall and said upper side wall edge, when said release mechanism is activated, said release mechanism comprising:
   a foot pedal,
   one or more first latches that move from a secure position to an unsecure position when said foot pedal moves,
   one or more connecting members that connect said foot pedal to said one or more first latches, and
   one or more connector components (1) that are attached to (a) said top wall, (b) one of said four side walls, or (c) both (a) and (b), and (2) that disconnect from said one or more first latches when said foot pedal moves so as to provide the at least one release opening.

* * * * *